6021X
T. Ewbank,
Steam Safety Valve.
Patented June 8, 1830.
Fig: 1.
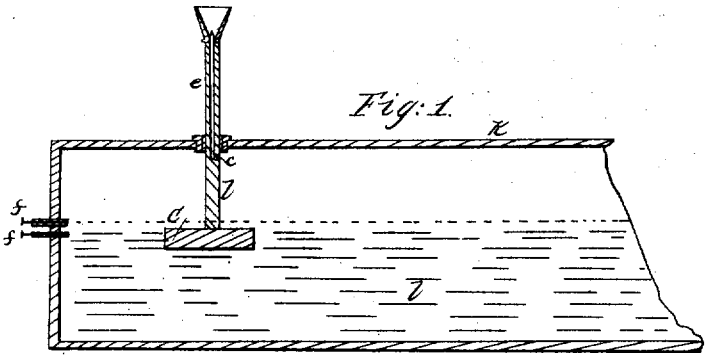
Fig: 3.
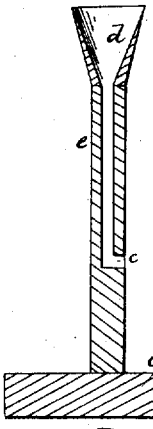
Fig: 2.
Fig: 4.
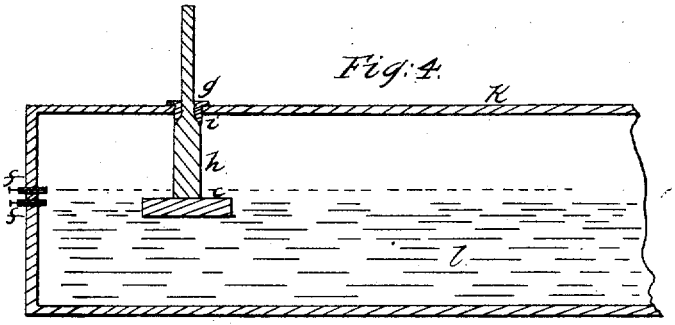
Fig: 5.
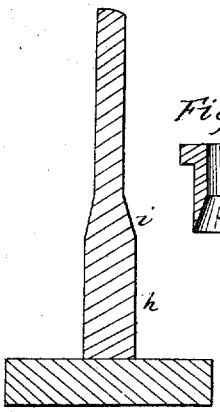
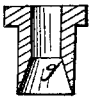
AM. PHOTO-LITHO. CO. N.Y. (OSBORNE'S PROCESS.)

X6021 June 8. 1830 79.

Thomas Ewbank

The Schedule referred to in these Letters Patent, and making part of the
same ———— containing a description in the words of the said Thomas
Ewbank himself, of his Improvement in the Machine for detecting & making
known a deficiency of water in Steam Engine Boilers, called the Detector.

Be it known that I Thomas Ewbank of the City of New York, in
the State of New York, have invented an improved machine, for detecting & making
known a deficiency of water in Steam Engine Boilers, which I call a Detec-
-tor, and that the following is a full and exact description of the same, reference
being had to the drawings accompanying this Specification, and which form
a part thereof. At any convenient place on the top of a Boiler, a hole is
drilled through and a stuffing box properly fixed to it, to admit a smooth metal-
lic rod, of about half an inch diameter, to slide easily thro it, in a perpendicular
direction, and without letting out the steam: the length of this rod may be about a
foot longer than the distance between the top of the boiler and the surface of the water
in it, when at its proper height. The lower end of this rod is attached to a float
properly made to rise and fall with the water in the boiler, and sufficiently
heavy to overcome the friction of the rod thro the stuffing box. The upper part
of the rod, that is, from its top to a little below where it enters the boiler, is made
hollow; and a small hole is made into it laterally, or at right angles to its length,
near the bottom of the hollow part, and so as to communicate with that part: this
hole (which is about an eighth of an inch diameter) is made at such part of the rod,
as that when the water is at its proper height, this hole may be above half
an inch above the boiler, or above that part of it, where it comes in contact with
the steam; so, that when the water sinks half an inch in the boiler, the float
and rod will sink also, and consequently bring the small hole inside of the boil-
er; thro which the steam will rush into the hollow part and escape at top,
making known by its noise a deficiency of water within. To increase this
noise, a boatswain's whistle, the mouth of an organ pipe, a trumpet shaped
tube, or other suitable instrument, may be fixed to the top of the rod as
~~circumstances may require. the diameter of the rod should be the same through~~
out its length. The part of the rod outside of the boiler may be graduated, so that
thereby, the depth of water within may always be known, and that as well when
it is below the gauge cocks, as when above them. When it is desirable to avoid the

X6021 friction of the stuffing box, I use a rod of the same length, but solid throughout, and about three quarters of an inch diameter, one end of this, for the length of two or three inches, I turn down till it is only half an inch diameter, making that part of it conical where the small part joins the larger, this conical part forms one half of a valve; the corresponding half is properly fixed to the top of the boiler, with its face inwards, and a hole is drilled thro its center, which admits the small end of the rod to pass thro till the conical part comes close up and thus rendering it steam tight. The lower end of the rod is attached to a float as before mentioned so that when the water sinks in the boiler, the float and rod sink also, and consequently opens the valve, through which the steam escapes, and gives, by its noise, notice of the fact. It is also to be observed in the construction of this valve, that, that part of the rod inside of the boiler, which connects the float to the valve, should be of one thickness throughout its length, and its diameter the same as that of the face of the valve:— for, if the area of this face or closing part of the valve be greater than the rod's diameter; the pressure of the steam upon it, over & above that upon the rod, would be in proportion to the difference,— and this pressure would also vary as the density of the steam in the boiler changed:— consequently, it would derange the action of the float, and might prevent the valve from opening, even after the water had sunk below the float: and on the contrary, should the rod below the valve, be made larger than the face of it, the steam would have a constant tendency to open it, whatever might be the quantity of water in the Boiler Thomas Ewbank Witnesses Hay. S. Mackay M. B. Hart.

[illegible]